US011655341B2

(12) United States Patent
Tanaka et al.

(10) Patent No.: US 11,655,341 B2
(45) Date of Patent: May 23, 2023

(54) METHOD FOR PREPARING A RADICAL-POLYMERIZABLE ORGANOPOLYSILOXANE, A RADIATION-CURABLE ORGANOPOLYSILOXANE COMPOSITION, AND A RELEASE SHEET

(71) Applicant: Shin-Etsu Chemical Co., Ltd., Tokyo (JP)

(72) Inventors: Kenji Tanaka, Annaka (JP); Shunji Aoki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 435 days.

(21) Appl. No.: 16/757,980

(22) PCT Filed: Sep. 28, 2018

(86) PCT No.: PCT/JP2018/036433
§ 371 (c)(1),
(2) Date: Apr. 21, 2020

(87) PCT Pub. No.: WO2019/082601
PCT Pub. Date: May 2, 2019

(65) Prior Publication Data
US 2020/0339757 A1    Oct. 29, 2020

(30) Foreign Application Priority Data
Oct. 24, 2017  (JP) .............................. JP2017-205205

(51) Int. Cl.
| | |
|---|---|
| C08G 77/08 | (2006.01) |
| C09J 7/40 | (2018.01) |
| B32B 7/12 | (2006.01) |
| B32B 27/08 | (2006.01) |
| B32B 27/36 | (2006.01) |
| C07F 7/00 | (2006.01) |
| C07F 7/08 | (2006.01) |
| C08F 299/08 | (2006.01) |
| C08G 77/20 | (2006.01) |
| C08G 77/38 | (2006.01) |

(52) U.S. Cl.
CPC ................. *C08G 77/08* (2013.01); *B32B 7/12* (2013.01); *B32B 27/08* (2013.01); *B32B 27/36* (2013.01); *C07F 7/00* (2013.01); *C07F 7/0838* (2013.01); *C08F 299/08* (2013.01); *C08G 77/20* (2013.01); *C08G 77/38* (2013.01); *C09J 7/40* (2018.01); *B32B 2405/00* (2013.01)

(58) Field of Classification Search
CPC .................. C08G 77/08; C08G 77/38
See application file for complete search history.

(56) References Cited

U.S. PATENT DOCUMENTS

| | | | | |
|---|---|---|---|---|
| 4,777,265 A | * | 10/1988 | Merger ................ | C07D 245/02 540/492 |
| 4,940,766 A | * | 7/1990 | Gay ....................... | C08G 77/38 556/440 |
| 5,145,915 A | | 9/1992 | Weitemeyer et al. | |
| 5,343,501 A | | 8/1994 | Kadono et al. | |
| 5,391,405 A | | 2/1995 | Irifune et al. | |
| 5,856,611 A | * | 1/1999 | Schlaefer ............... | C07C 67/03 554/174 |
| 6,288,129 B1 | * | 9/2001 | Gruning ................ | C08G 77/46 528/26 |
| 2005/0136269 A1 | * | 6/2005 | Doehler ............... | C09D 183/06 428/447 |
| 2007/0027338 A1 | | 2/2007 | Furuta et al. | |
| 2008/0268161 A1 | | 10/2008 | Chu et al. | |
| 2009/0234089 A1 | | 9/2009 | Ueyama et al. | |
| 2010/0311919 A1 | | 12/2010 | Ono et al. | |
| 2013/0090492 A1 | * | 4/2013 | Goossens ................ | C07C 68/06 558/275 |
| 2017/0130108 A1 | | 5/2017 | Bradford et al. | |
| 2019/0309133 A1 | * | 10/2019 | Sathiosatham ...... | B01J 31/0212 |
| 2022/0081565 A1 | * | 3/2022 | Liu ........................ | C08K 5/098 |
| 2022/0228038 A1 | * | 7/2022 | Tanaka ................... | C08G 77/20 |

FOREIGN PATENT DOCUMENTS

| | | |
|---|---|---|
| CA | 2811363 A1 | 3/2012 |
| CN | 101360753 A | 2/2009 |
| JP | 63-185989 A | 8/1988 |
| JP | HEI5-83570 | 4/1993 |
| JP | 2583677 B2 | 2/1997 |
| JP | 2669947 B2 | 10/1997 |
| JP | 3780113 B2 | 5/2006 |
| JP | 3925604 B2 | 6/2007 |

(Continued)

OTHER PUBLICATIONS

International Search Report for International Application No. PCT/JP2018/036433, dated Jan. 8, 2019.
European Search Report for Application No. 18869935.9 dated Jul. 15, 2021.

*Primary Examiner* — Margaret G Moore
(74) *Attorney, Agent, or Firm* — Rimon, P.C.

(57) ABSTRACT

Provided is a method for preparing a (meth)acryloyl group-containing organopolysiloxane having a step of transesterification between the components (a1) and (a2) in the presence of the components (a3) and (a4) to obtain the (meth)acryloyl group-containing organopolysiloxane, wherein component (a1) is an organopolysiloxane represented by the average composition formula (1) which has a hydroxy group-containing group, component (a2) is a (meth)acrylic acid ester represented by the general formula (2), component (a3) is a zirconium metal complex in an amount such that a molar ratio of component (a3) to the hydroxy group of component (a1) is 0.001 to 0.1, and component (a4) is a hydroxy group-containing amine represented by $HON(R^4)_2$ in an amount such that a molar ratio of component (a4) to component (a3) is 0.10 to 1.5, wherein $R^4$ is, independently of each other, a linear or branched aliphatic hydrocarbon group having 1 to 6 carbon atoms.

6 Claims, No Drawings

(56) References Cited

FOREIGN PATENT DOCUMENTS

| | | |
|---|---|---|
| JP | 2009-517526 A | 4/2009 |
| JP | 4251575 B2 | 4/2009 |
| JP | 5433426 B2 | 3/2014 |
| JP | 5882334 B2 | 3/2016 |
| JP | 6025476 B2 | 11/2016 |
| JP | 2017-149871 A | 8/2018 |
| KR | 1020080072949 A | 8/2009 |

* cited by examiner

METHOD FOR PREPARING A RADICAL-POLYMERIZABLE ORGANOPOLYSILOXANE, A RADIATION-CURABLE ORGANOPOLYSILOXANE COMPOSITION, AND A RELEASE SHEET

CROSS REFERENCE TO RELATED APPLICATIONS

The present application is a National Stage application of and claims priority to PCT application PCT/JP2018/036433 filed Sep. 28, 2018, which claims priority to Japanese Application No. 2017-205205 filed Oct. 24, 2017, the contents of the above application are incorporated by reference herein in their entireties.

TECHNICAL FIELD

The present invention relates to a method for preparing a (meth)acryloyl group-containing radical-polymerizable organopolysiloxane. Specifically, the present invention relates to a method for preparing a (meth)acryloyl group-containing radical-polymerizable organopolysiloxane, using safe and less-expensive raw materials, without using (meth) acrylic acid. Further, the present invention relates to a radiation-curable organopolysiloxane composition which may provide a cured product suitable for a release sheet and relates to release sheets.

BACKGROUND ART

An organopolysiloxane composition is applied on a surface of various substrates such as various paper, laminated paper, synthetic film, transparent resin, and metal and crosslink-reacted to prepare a cured film. In this way, release sheets releasable from an adherent or adhesive substance are prepared, such as a release paper and a release film.

There are various methods for curing polyorganosiloxane compositions. For example, a condensation reaction with an organometallic compound, a cure with an organic peroxide, a hydrosilylation reaction catalyzed by a platinum group metal catalyst have been known. However, heating is necessary in the aforesaid curing method. Therefore, curing at a low temperature or room temperature is desired in order to improve productivity and to save energy. Recently, a substrate having poor heat resistance, such as a polyethylene terephthalate (PET) film, is often used in an electronic members and optical materials.

Therefore, radiation for curing is drawing attention for providing curing energy other than heat.

Examples of the radiation curing includes radical polymerization of a (meth)acrylic-modified polysiloxane, cationic polymerization by ring opening of an epoxy group of an epoxy-modified polysiloxane, and an en-thiol reaction between mercapto-modified polyorganosiloxane and alkenyl-modified polyorganosiloxane.

Among them, the radical polymerization of a (meth) acrylic-modified polysiloxane has a great advantage that adhesiveness to a substrate is very good, though the curing is hindered by the presence of oxygen and, therefore, a device for lowering an oxygen concentration is needed. The radical polymerization of a (meth)acrylic-modified polysiloxane may be applied on film substrates which have poor heat resistance so as to shrink by heat, and may be used as a backtreatment agent for an adhesive tape, in a release paper for an adhesive label, a release film and a release tape. Thus, its market is expected to extend in the future.

The following Patent Literatures 1, 2 and 3 describe inventions relating to release agents containing a radical-polymerizable organopolysiloxane containing a (meth)acryloyl group. Many methods are also proposed for the synthesis of a radical polymerizable organopolysiloxane containing a (meth)acryloyl group. However, they have several problems.

Japanese Examined Patent Publication No. Hei 5-83570 (Patent Literature 4) describes a method for synthesizing a (meth)acryloyl group-containing radical-polymerizable organopolysiloxane by reacting an epoxy group-containing polyorganosiloxane with a mixture of (meth)acrylic anhydride and (meth)acrylic acid. In this method, the epoxy group is reacted with (meth)acrylic acid to cause a ring opening to thereby form a hydroxy group. If a too much large amount of a hydroxy group is formed, the obtained compound is highly viscous. Further, (meth)acrylic acid is highly toxic and has a problem in safety. Since (meth)acrylic acid has a high boiling point, there is a high possibility that (meth)acrylic acid and by-products derived from (meth) acrylic acid are not removed by stripping after the reaction. There is another problem that (meth)acrylic anhydride is expensive.

Japanese Patent Publication No. 3780113 (Patent Literature 3) describes a method for preparing a (meta) acrylate group-containing organopolysiloxane by esterification of a polyorganosiloxane having a polyhydroxyalkyl ether group with (meta)acrylic acid and a monocarboxylic acid having no polymerizable double bond. The esterification reaction between a hydroxy group at the end of the polyhydroxyalkyl ether group and (meth)acrylic acid results in a less content of the hydroxy group in the obtained compound and, accordingly, a lower viscosity. However, there is a problem that (meth)acrylic acid is highly toxic. Furthermore, since (meth) acrylic acid has a high boiling point, there is a high possibility that (meth)acrylic acid and by-products derived from (meth)acrylic acid are not removed by stripping after the reaction.

Japanese Patent Publication No. 3925604 (Patent Literature 5) describes a method for preparing a (meta)acryloyl group-containing radical polymerizable organopolysiloxanes by reacting an $\alpha,\omega$-dihydroxyorganopolysiloxane with a (meta)acryloxy group-containing silane at a reduced pressure in the presence of an acidic or basic catalyst. Highly toxic (meth)acrylic acid is not used in this method. However, there is a problem that the (meth)acryloxy group-containing silane is very expensive.

Japanese Patent Publication No. 5433426 describes a method for preparing a (meth)acryloyl group-containing organopolysiloxane by dehydrogenation condensation of an organopolysiloxane having hydroxy groups at both terminals and a hydroxy group-containing (meth)acryloyl compound with an organopolysiloxane having a hydrosilyl group in the presence of a hydroxyamine compound as a catalyst. Highly toxic (meth)acrylic acid or expensive (meth)acryloxy group-containing silane is not used in this method. However, a large amount of a hydrogen gas generates during the dehydrogenation condensation, which is very dangerous. The hydroxyamine compound as a dehydrogenation condensation catalyst is easily adsorbed by the (meth)acryloxy group-containing silane. Therefore, the viscosity of the reaction mixture may increase with the progress of the polymerization of the (meth)acryloxy group in the presence of hydroxyamine.

PRIOR LITERATURE

Patent Literature

[Patent Literature 1] Japanese Patent Publication No. 2,583,677
[Patent Literature 2] Japanese Patent Publication No. 2,669,947
[Patent Literature 3] Japanese Patent Publication No. 3,780,113
[Patent Literature 4] Japanese Examined Patent Publication No. Hei 5-83570
[Patent Literature 5] Japanese Patent Publication No. 3,925,604
[Patent Literature 6] Japanese Patent Publication No. 5,433,426
[Patent Literature 7] Japanese Patent Publication No. 4,251,575
[Patent Literature 8] Japanese Patent Publication No. 5,882,334
[Patent Literature 9] Japanese Patent Publication No. 6,025,476

SUMMARY OF THE INVENTION

Problems to be Solved by the Invention

One of the objects of the present invention is to provide a (meth)acryloyl group-containing radical-polymerizable organopolysiloxane having a low viscosity, and to provide a method for preparing the organopolysiloxane less costly and without using harmful raw materials. Another object is to provide a (meth)acryloyl group containing organopolysiloxane useful for providing release sheets having light release and high adhesion properties.

Means for Solving the Problems

For example, Japanese Patent Publication 4251575 (Patent Literature 7) describes a method for transesterification of an ester with an alcohol in contact with a catalyst comprising an amorphous zirconium oxide and an oxide of metal selected from aluminum, titanium, and silica, as a method for synthesizing a (meta)acryloyl group-containing compound by transesterification of a hydroxy-containing organic compound with a (meta)acrylate ester. In this method, an alcohol is limited to such having a low boiling temperature because the alcohol is needed to be in a gaseous stage. The ester to be used in the method is derived from oils or fats such as triglycerides, diglycerides, and monoglycerides.

Japanese Patent Publication No. 5882334 (Patent Literature 8) describes a method for preparing an N,N-substituted amino acrylate by transesterification of an N,N-substituted amino alcohol with a (meta)acrylic ester in the presence of an inorganic salt.

Japanese Patent Publication No. 6025476 (Patent Literature 9) describes a method for preparing a (meta)acryloyl group-containing isocyanate compound by a transesterification of a tri-substituted hydroxyurea compound derived from an amino alcohol with a (meta)acrylate ester in the presence of an acetylacetone metal complex to obtain a (meta) acryloyl group-containing urea compound, and subsequently reacting the urea compound with hydrogen chloride. In this method, the transesterification is conducted at a reduced pressure of 15 to 25 KPa to remove a by-produced low-boiling alcohol. However, under the afore-mentioned reduced pressure condition, the (meth)acrylic acid ester volatilizes considerably and is removed, resulting in decreased pot yield.

A zirconium metal complex is used in the transesterification reaction in the aforesaid Patent Literatures. However, there is no mention on a hydroxy group-containing polyorganosiloxane. In the transesterification of an organopolysiloxane having a hydroxy group-containing organic group with a (meth)acrylic acid ester, the transesterification does not proceed sufficiently with a zirconium metal complex catalyst only.

As a result of intensive have made research to solve the afore-mentioned problems, the inventors have found that the transesterification is promoted by a hydroxy group-containing amine as an additive, so that introduction of the (meth) acryloyl group in the hydroxy group-containing polyorganosiloxane is increased.

That is, the inventors have found that the transesterification of a polyorganosiloxane having a hydroxy group-containing organic group with a (meth)acrylic acid ester in the presence of a zirconium metal complex and a hydroxy group-containing amine gives increased introduction of a (meth)acryloyl group into the organopolysiloxane.

Furthermore, the present inventors have found that the organopolysiloxane obtained in the aforementioned method has a low viscosity. In addition, expensive (meth)acryloyl-silane or highly harmful (meth)acrylic acid are not used in the present method, so that the desired polysiloxane is prepared less costly and safely. A release sheet comprising a cured product of the radiation curable organopolysiloxane composition containing the organopolysiloxane has light release and good adhesion properties.

Thus, the present invention provides a method for preparing a (meth)acryloyl group-containing organopolysiloxane, comprising a step of transesterification between the following components (a1) and (a2) in the presence of the following components (a3) and (a4) to obtain the (meth) acryloyl group-containing organopolysiloxane, (a1) an organopolysiloxane represented by the following average composition formula (1):

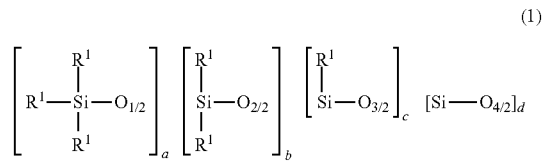

(1)

wherein $R^1$ is, independently of each other, a substituted or unsubstituted, monovalent hydrocarbon group having 1 to 10 carbon atoms, an alkoxy group, or a monovalent hydrocarbon or (poly)oxyalkylene alkyl group which has a hydroxy group at a terminal, hereinafter referred to as a hydroxy group-containing group, wherein at least one of $R^1$ is the hydroxy group-containing group, a is a positive number of 2 or more; b is an integer number of 0 or more, c is an integer of 0 or more, and d is an integer number of 0 or more, and $2<=a+c+d<=1,000$, (a2) a (meth)acrylic acid ester represented by the following general formula (2):

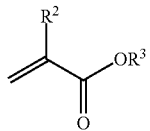

(2)

wherein $R^2$ is a hydrogen atom or a methyl group and $R^3$ is a linear or branched hydrocarbon group having 1 to 6 carbon atoms,
in an amount such that a molar ratio of component (a2) to the hydroxy group of component (a1) is 1 to 10,
(a3) a zirconium metal complex in an amount such that a molar ratio of component (a3) to the hydroxy group of component (a1) is 0.001 to 0.1, and
(a4) a hydroxy group-containing amine represented by $HON(R^4)_2$ in an amount such that a molar ratio of component (a4) to component (a3) is 0.10 to 1.5, wherein $R^4$ is, independently of each other, a linear or branched aliphatic hydrocarbon group having 1 to 6 carbon atoms.

Furthermore, the present invention provides a radiation-curable organopolysiloxane composition comprising the following components (A) and (B),
(A) 100 parts by mass of a radical-polymerizable organopolysiloxane which has a viscosity of 5 to 3000 mPa·s at 25 degrees C. and is represented by the following average composition formula (7):

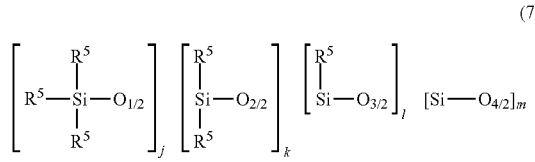

(7)

wherein $R^5$ is, independently of each other, a substituted or unsubstituted, monovalent hydrocarbon group having 1 to 10 carbon atoms, an alkoxy group, the afore-defined hydroxy group-containing group, or a monovalent hydrocarbon or (poly)oxyalkylene alkyl group which has a (meth) acryloyloxy group at a terminal, hereinafter referred to as a (meth)acryloyloxy group-containing group, wherein at least one of $R^5$ is the (meth)acryloyloxy group-containing group, j is a positive number of 2 or more, k is an integer number of 0 or more, l is an integer number of 0 or more, m is an integer number of 0 or more and $2<=j+k+l+m<=1{,}000$, and the number of the hydroxy group-bonding silicon atoms is 0 to 30%, based on the total number of silicon atoms, and
(B) 0.1 to 10 parts by mass of a radical polymerization initiator.

EFFECTS OF THE INVENTION

According to the method of the present invention, an organopolysiloxane having a lower viscosity is provided, compared to the conventional method where a (meth)acrylic acid is used as a raw material. Additionally, the present method is less costly and excellent in safety, because an expensive raw material or a highly harmful (meth)acrylic acid is not used. A release sheet composed of a cured product of the radiation curable organopolysiloxane composition comprising the radical-polymerizable organopolysiloxane of the present invention is of light release and high adhesiveness, compared to the release sheets containing a cured product of the conventional (meth)acryloyl group containing organopolysiloxane composition obtained from (meth) acrylic acid.

DETAILED DESCRIPTION OF THE INVENTION

Hereinafter, the method of the present invention will be described below in further detail.

The present invention provides a method for preparing a (meth)acryloyl group-containing organopolysiloxane. The (meth)acryloyl group-containing organopolysiloxane obtained by the present method is represented by the following average composition formula (7):

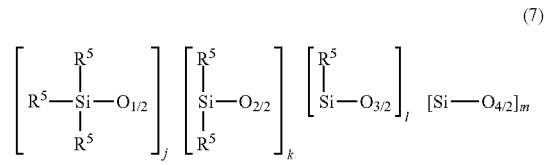

(7)

wherein is, independently of each other, a substituted or unsubstituted, monovalent hydrocarbon group having 1 to 10 carbon atoms, an alkoxy group, the afore-defined hydroxy group-containing group, or a monovalent hydrocarbon or (poly)oxyalkylene alkyl group which has a (meth) acryloyloxy group at a terminal, hereinafter referred to as a (meth)acryloyloxy group-containing group, wherein at least one of $R^5$ is the (meth)acryloyloxy group-containing, group, j is a positive number of 2 or more, k is an integer number of 0 or more, 1 is an integer number of 0 or more, in is an integer number of 0 or more. and $2<=j+k+l+m<=1{,}000$, and the number of the hydroxy group-bonding silicon atoms is 0 to 30%, based on the total number of the silicon atoms. The (meth)acryloyl group containing organopolysiloxane may have a viscosity of 5 to 3000 mPa·s at 25 degrees C.

The present method is characterized in that the method comprises a step of transesterification of an organopolysiloxane (a1) represented by the following average composition formula (1) and an acrylate ester (a2) represented by the following general formula (2) in the presence of a zirconium metal complex (a3) and a hydroxy group-containing amine (a4) represented by $HON(R^4)_2$ to obtain the (meth)acryloyl group-containing organopolysiloxane.

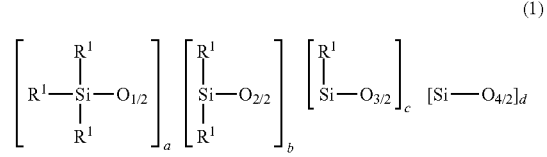

(1)

In the formula (1), $R^1$ is, independently of each other, a substituted or unsubstituted, monovalent hydrocarbon group having 1 to 10 carbon atoms, an alkoxy group, or a monovalent hydrocarbon or (poly)oxyalkylene alkyl group which has a hydroxy group at a terminal, hereinafter referred to as a hydroxy group-containing group, wherein at least one of $R^1$ is the hydroxy (group-containing group, a is a positive number of 2 or more, b is an integer number of 0 or more, c is an integer number of 0 or more, and d is an integer number of 0 or more, and 2<=a+b+c+d<=1,000.

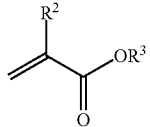
(2)

In the formula (2), $R^2$ is a hydrogen atom or a methyl group and $R^3$ is a linear or branched hydrocarbon group having 1 to 6 carbon atoms.

In the formula (1), $R^1$ is a substituted or unsubstituted monovalent hydrocarbon group having 1 to 10 carbon atoms, an alkoxy group, or a hydroxy group-containing group, and at least one of $R^1$ is a hydroxy group-containing group. Examples of the monovalent hydrocarbon group having 1 to 10 carbon atoms include alkyl groups such as a methyl group, an ethyl group, a propyl group, and a butyl group, cycloalkyl groups such as a cyclohexyl group, and aryl groups such as a phenyl group and a tolyl group. A part or all of the hydrogen atoms bonded to the carbon atoms in these groups may be substituted with a halogen atom such as chlorine and fluorine or an alkoxy group, such as a 3,3,3-trifluoropropyl group, a perfluorobutyl ethyl group, a perfluorooctyl ethyl group, a methoxypropyl group and an etoxypropyl group. Examples of the alkoxy group include a methoxy group, an ethoxy group, an isopropoxy group and a butoxy group. Preferred are a methyl group, an ethyl groups, a methoxy group, an ethoxy group and a hydroxy group-containing group, provided that, at least one $R^1$ is a hydroxy group-containing group.

Preferably, the number of the silicon atoms to which the hydroxy group-containing group is bonded is 1 to 50%, preferably 2 to 45%, more preferably 3 to 40%, based on the total number of silicon atoms. If the number of the hydroxy group-bonding silicon atom is less than the aforesaid lower limit, the reaction rate of the transesterification is poor. If the number of the hydroxy group-bonding silicon atom is larger than the aforesaid upper limit, a release property of a release sheet, releasing from and an adhesive tape, may be extremely poor, where the cured product of the radiation curable organopolysiloxane composition containing the (meth)acryloyl group-containing organopolysiloxane obtained by the present method is used in a release sheet.

The monovalent hydrocarbon group having a hydroxy group at the terminal is preferably a monovalent hydrocarbon group having one hydroxy group at the terminal and 2 to 20 carbon atoms, more preferably 3 to 15 carbon atoms. More preferably, a monovalent hydrocarbon group having one hydroxy group at the end and 2 to 10 carbon atoms, preferably 3 to 6 carbon atoms. The (poly)oxyalkylene alkyl group having a hydroxy group at the terminal has one hydroxy group at the terminal, and preferably has 4 to 25 carbon atoms, more preferably 5 to 16 carbon atoms. Examples of the oxyalkylene groups include an oxyethylene group, an oxyisopropylene group, an oxy-n-propylene group and an oxybutylene group. Oxyethylene and oxyisopropylene groups are preferred. The (poly)oxyalkylene alkyl group may have two or more kinds of oxyalkylene groups. The hydroxy group-containing group is represented by, for example, the following formulas, wherein the mark "*" represents a position to which a silicon atom of the polysiloxane bonds.

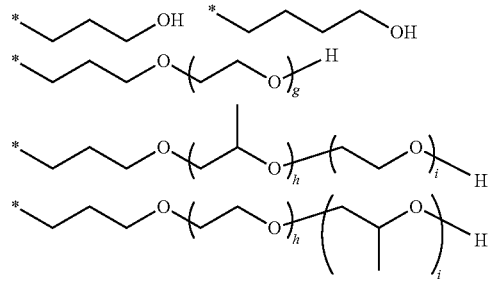

wherein g is an integer of 1 to 10, h and i are, independently of each other, an integer of 1 to 5. Preferably, g is an integer of 1 to 7, and h and i are, independently of each other, an integer of 1 to 3. More preferably, g is an integer of 1 to 4 and h and i are, independently of each other, 1 or 2. In the aforementioned formula, the order of bonding of the ethylene oxide and the propylene oxide shown in the parentheses is not limited, and may be at random or such as to form a block structure.

The polyorganosiloxane having a hydroxy group-containing group is obtained by hydrosilation of a hydrosilyl group-containing polyorganosiloxane and a compound having a hydroxy group and an unsaturated bond, as represented by the following formula.

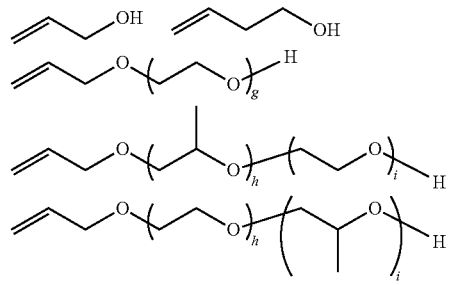

wherein g, h and i are as described above, and the order of bonding of the ethylene oxide and the propylene oxide in the parentheses is not limited and may be at random or such as to form a block structure.

The hydrosilylation between the polyorganosiloxane having a hydrosilyl group and the aforementioned compound having a hydroxy group and an unsaturated bond may be carried out according to conventionally known manners, for example, as described in Japanese Patent Publication No. 3780113 (Patent Literature 3). If g is greater than 10 or h or i is greater than 5 in the aforementioned compound having the oxyalkylene structure, this compound is not distilled off in distillation to remove components having low boil points at heating and reduced pressure after the hydrosilylation reaction, which is not preferable.

In the average composition formula (1), a is a positive number of 2 or more, b is an integer number of 0 or more, c is an integer number of 0 or more, d is an integer number of 0 or more, and 2<=a+b+c+d<=1,000. Preferably, these numbers are such that the amount of the hydroxy group satisfies the aforesaid range, and the organopolysiloxane has a viscosity of 5 to 10,000 mPa·s, more preferably 10 to 5,000 mPa·s. at 25 degrees C. The viscosity may be determined by a BM rotary viscometer.

The polyorganosiloxane represented by the average composition formula (1) includes, for example, compounds represented by the following structures.

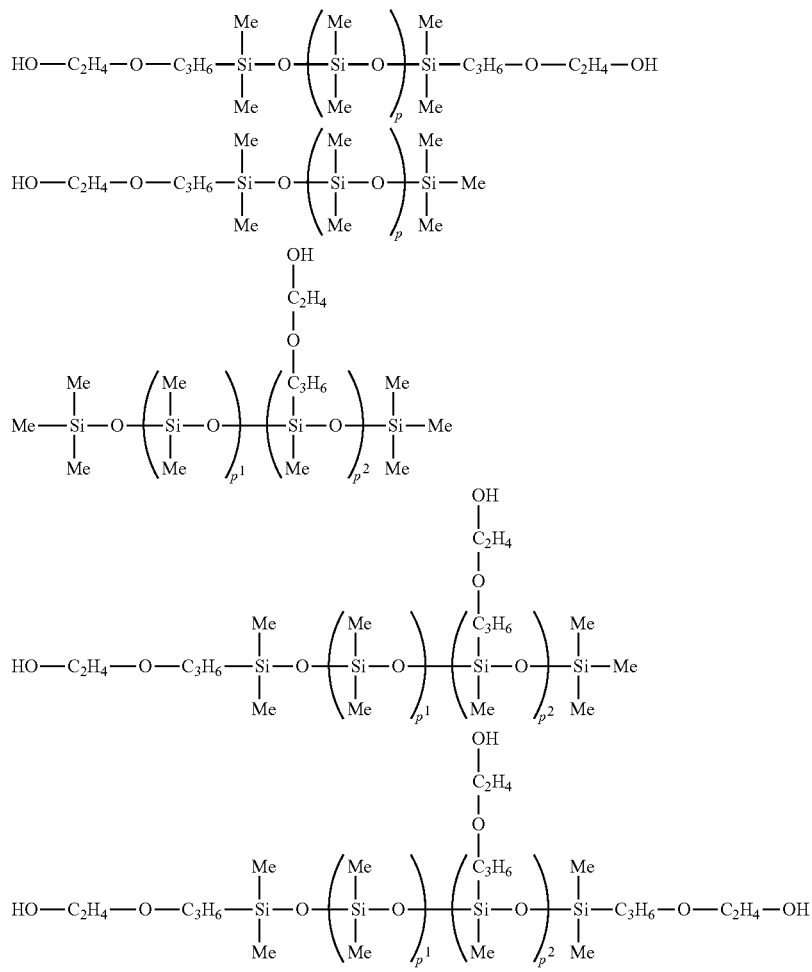

wherein p is an integer number of 0 to 1,000, p1 is an integer number of 0 to 800, and p2 is a positive number from 1 to 200.

The (meth)acrylic acid ester (a2) is represented by the following general formula (2).

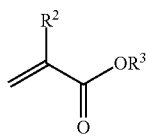

General formula (2)

In the formula (2), $R^2$ is a hydrogen atom or a methyl group. $R^3$ is an unsubstituted or substituted linear or branched monovalent hydrocarbon group having 1 to 6 carbon atoms, such as, alkyl groups such as a methyl group, an ethyl group, a propyl group, and a butyl group, and cycloalkyl groups such as a cyclohexyl group, and a phenyl group. $R^3$ is preferably an alkyl group having 1 to 3 carbons, i.e., a methyl group, an ethyl group and a propyl group, in view of industrial costs and easy progress of the transesterification. If the number of the carbon atoms in $R^3$ is larger than 6, a boiling point of an alcohol produced in the transesterification is too high and it is difficult to remove the alcohol from the reaction system, resulting in slow transesterification, which is not preferable.

The amount of the (meth)acrylic acid ester is preferably such that a molar ratio of the (meth)acrylic acid ester (a2) to mole of the hydroxy group of organopolysiloxane (a1) is 1.0 to 10, preferably 1.5 to 9, more preferably 2 to 8. If the amount of (meth)acrylic acid ester (a2) is less than the afore-mentioned lower limit, the introduction ratio of the (meth)acryloyl group by the transesterification is lower. If the amount of the (meth)acrylic acid ester (a2) is larger than the afore-mentioned upper limit, the introduction ratio of the (meth)acryloyl group by the transesterification is high, but the amount of the (meth)acrylic acid ester (a2) added is too large, so that the pot yield is lower.

In the present invention, the (meth)acryloyl group is introduced into the organopolysiloxane by the transesterification between the organopolysiloxane represented by the formula (1) and having the hydroxy group-containing organic group and the (meth)acrylic acid ester represented by the formula (2). Mechanism of the reaction is supposed as described in below. The present invention is characterized in that the transesterification is carried out in the presence of zirconium metal complex (a3) which is a transesterification catalyst and a hydroxy group-containing amine (a4). An introduction ratio of the (meth)acryloyl group is low with only the zirconium metal complex. However, the introduction ratio is improved with the hydroxy group-containing amine in combination with the zirconium metal complex.

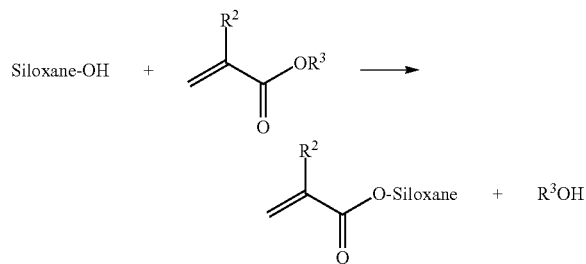

(a3) Zirconium Metal Complex

The zirconium metal complex (a3) is preferably represented by the following general formula (3):

$$Zr(L^1)_e(L^2)_f \quad (3)$$

wherein $L^1$ is a ligand selected from a β-dicarbonylate anion and an enolate anion of a β-dicarbonyl-containing compound, $L^2$ is an anionic ligand different from $L^1$, e is an integer of 2 to 4 and f=4-e.

Examples of L' in formula (3) include an enolate anion of β-dicarbonyl-containing compound derived from β-diketone such as 2,4-pentanedione (acac), 2,4-hexanedione, 2,4-heptanedione, 3,5-heptanedione, 3-ethyl-2,4-pentanedione, 5-methyl-2,4-hexanedione, 2,4-octanedione, 3,5-octanedione, 5,5-dimethyl-2,4-hexanedione, 6-methyl-2,4-heptanedione, 2,2-dimethyl-3,5-nonanedione, 2,6-dimethyl-3,5-heptanedione, 2-acetylcyclohexanone (Cy-acac), 2,2,6,6-tetramethyl-3,5-heptanedione (t-Bu-acac), 1,1,1,5,5,5-hexafluoro-2,4-pentanedione (F-acac), benzoylacetone, dibenzoylmethane, 3-methyl-2,4-pentanedione, 3-acetyl-2-pentanone, 3-acetyl-2-hexanone, 3-acetyl-2-heptanone, 3-acetyl-5-methyl-2-hexanone, 4-t-butyl-4'-methoxydibenzoylmethane, 4,4'-dimethoxydibenzoylmethane and 4,4'-di-t-butyldibenzoylmethane; a β-ketoesterate anion derived from methyl acetoacetate, ethyl acetoacetate, n-propyl acetoacetate, isopropyl acetoacetate, n-butyl acetoacetate, sec-butyl acetoacetate, i-butyl acetoacetate, tert-butyl acetoacetate, isopentyl acetoacetate, n-hexyl acetoacetate, n-octyl acetoacetate, 1-methylheptyl acetoacetate, n-nonyl acetoacetate, n-decyl acetoacetate and n-dodecyl acetoacetate. Preferred are 2,4-pentanedione (acac), 2,4-hexanedione, 3,5-heptanedione, 3-ethyl-2,4-pentanedione, 2,6-dimethyl-3,5-heptanedione, 2-acetylcyclohexanone (Cy-acac), 2,2,6,6-tetramethyl-3,5-heptanedione (t-Bu-acac), benzoylacetone, dibenzoylmethane, 3-methyl-2,4-pentanedione, methyl acetoacetate, ethyl acetoacetate, n-propyl acetoacetate, isopropyl acetoacetate, n-butyl acetoacetate, sec-butyl acetoacetate, i-butyl acetoacetate, and t-butyl acetoacetate. Further preferred are 2,4-pentanedione (acac), 2,4-hexanedione, 3,5-heptanedione, 3-ethyl-2,4-pentanedione, 2,6-dimethyl-3,5-heptanedione, 2-acetylcyclohexanone (Cy-acac), 2,2,6,6-tetramethyl-3,5-heptanedione (t-Bu-acac), 3-methyl-2,4-pentanedione, methyl acetoacetate, ethyl acetoacetate, n-propyl acetoacetate and isopropyl acetoacetate.

$L^2$ is an anionic ligand which differs from $L^1$. Examples of $L^2$ include fluoro, chloro, bromo, iodo, hexafluoroantimonate, hexafluorophosphate, tetrafluoroborate, hydroxy, mercapto, hydrodisulfide, methoxy, ethoxy, propoxy, methylthio, ethylthio, phenoxy, phenylthio, 4-nitrophenoxy, acetate, propionate, nitride, cyano, cyanato, thiocyanate, amino, and phosphino. Preferred are fluoro, chloro, bromo, iodine, tetrafluoroborate, hydroxy, methoxy, ethoxy, propoxy, phenoxy, acetate and propionate. More preferred are chloro, bromo, iodo, hydroxy, methoxy, ethoxy, propoxy, phenoxy and acetate.

e is an integer of 2 and 4 and f=4-e. Preferably, e is 3 or 4, more preferably 4. When e is larger, the catalytic activity for the transesterification reaction is better.

The amount of zirconium metal complex (a3) is such that the molar ratio of the complex (a3) to the hydroxy group of organopolysiloxane (a1) is 0.001 to 0.1, preferably 0.002 to 0.08, more preferably 0.003 to 0.06. If the amount of the zirconium metal complex is less than the afore-mentioned lower limit, the introduction ratio of the (meth)acryloyl group is lower. Even if the amount of the zirconium metal complex is larger than the afore-mentioned upper limit, no considerable acceleration of the transesterification is not expected, which is undesired in economy.

(a4) Hydroxy Group-Containing Amine

Component (a4) is a hydroxy group-containing amine represented by $HON(R^4)_2$. In the formula, $R^4$ is, independently of each other, a linear or branched aliphatic hydrocarbon group having 1 to 6 carbon atoms. Examples of $R^4$ include alkyl groups such as methyl, ethyl, propyl, or butyl groups. Methyl, ethyl, or propyl groups are preferred in view of the availability and ease of removal after the transesterification. More preferred are methyl and ethyl groups. Examples of the hydroxy group-containing amine include N,N-dimethylhydroxyamine, N,N-diethylhydroxyamine, and N,N-dibutylhydroxyamine.

The amount of hydroxy group-containing amine (a4) may be 0.10 to 1.5 mol, preferably 0.25 to 1.5 mol, more preferably 0.35 to 1.2 mol and even more preferably 0.45 to 1.0 mol, per mol of the zirconium metal complex (a3). If the amount of the hydroxy group-containing amine is less than the afore-mentioned lower limit, the introduction ratio of the (meth)acryloyl group is lower. Even if the amount of the hydroxy group-containing amine is larger than the afore-mentioned upper limit, the introduction ratio of the (meth)acryloyl group is not improved and, rather, thickening occurs due to radical polymerization of the (meth)acryloyl group.

(a5) Radical Polymerization Inhibitor

In the method of the present invention, a radical polymerization inhibitor may be further used in addition to components (a3) and (a4). Component (a5) may be a compound conventionally known as a radical polymerization inhibitor. Preferred are hindered phenolic compounds such as 2,6-di-tert-butyl-4-methylphenol (BHT), tris-(3,5-di-tert-butyl-4-hydroxybenzyl)-isocyanurate (IRGANOX3114, ex BASF and ADKSTAB AO-20, ex ADEKA), tris-(2-methyl-4-hydroxy-5-tert-butylphenyl)-butane (ADKSTAB AO-30, ex ADEKA), 4,4'-butylidene bis(3-methyl-6-tert-butylphenol) (ADKSTAB AO-40 ex ADEKA), n-octadecyl-β-(3,5-di-tert-butyl-4-hydroxyphenyl)propionate (IRGANOX1076, ex BASF and ADKSTAB AO-50, ex ADEKA), tetrakis[3-(3,5-di-tert-butyl-4-hydroxyphenyl)propionyloxymethyl] methane (IRGANOX1010,ex BASF and ADKSTAB AO-60, ex ADEKA), 2,4,6-tris[3,5-di(tert-butyl)-4-hydroxybenzyl]-1,3,5-trimethylbenzene (IRGANOX1330, ex BASF and ADKSTAB AO-330, ex ADEKA), ethylene bis (oxyethylene)bis[3-(5-tert-butyl-4-hydroxy-m-tolyl)propionate] (IRGANOX245, ex BASF), 1,6-hexanediol bis[3-(3,5-di-tert-butyl-4-hydroxyphenyl)propionate] (IRGANOX259, ex BASF), octyl-3,5-di-tert-butyl-4-hydroxy-hydrocinnamic acid (IRGANOX1135, ex BASF), 2-tert-butyl-4-methyl-6-(2-hydroxy-3-tert-butyl-5-methylbenzyl)phenyl acrylate (SUMILIZER GM, ex Sumitomo Chemical), and 2-[1-(2-hydroxy-3,5-di-tert-pentylphenyl) ethyl]-4,6-di-tert-pentylphenyl acrylate (SUMILIZER GS, ex Sumitomo Chemical). They may be used alone or in combination of two or more of them.

When the hindered phenolic compound is used as the radical polymerization inhibitor, the transesterification may be conducted without an optional organic solvent which will be explained below. The amount of the radical polymerization inhibitor is 0 to 1 part by weight, based on total 100 parts by weight of organopolysiloxane (a1) and (meth) acrylic acid ester (a2), preferably, is used, 0.001 to 1 part by weight, more preferably 0.01 to 1 part by weight, more preferably 0.01 to 0.5 part by weight, and even more preferably 0.05 to 0.3 part by weight. If the amount of the radical polymerization inhibitor is more than the aforesaid upper limit, the curability of the radiation curable organopolysiloxane composition containing the obtained radical polymerizable organopolysiloxane may be worse.

(a6) Organic Solvent

The transesterification in the present invention may be carried out without a solvent or in an organic solvent. Examples of the organic solvent include aromatic hydrocarbon solvents such as toluene and xylene, aliphatic hydrocarbon solvents such as hexane, heptane, octane, isooctane, cyclohexane, methylcyclohexane and isoparaffin, hydrocarbon solvents such as industrial gasoline, petroleum benzine, and sorbent naphtha, ether solvents such as diethyl ether, dipropyl ether, diisopropyl ether, dibutyl ether, 1,2-dimethoxyethane and 1,4-dioxane, or mixture of these. The solvent may be used alone or in combination of two or more of them.

The amount of the organic solvent is 0 to 200 parts by weight, or 1 to 200 parts by weight, relative to total 100 parts by weight of components (a1) through (a4) or, if component (a5) being present, relative to total 100 parts by weight of components (a1) through (a5). Preferred is 1 to 150 parts by weight, and more preferably 5 to 100 parts by weight.

The transesterification may be carried out by mixing the afore-mentioned components (a1) through (a4), and optionally the components (a5) and (a6), in the afore-mentioned amounts and by heating the mixture with stirring. The reaction temperature and the reaction time of the transesterification are not particularly limited but, usually, at a temperature of 40 to 150 degrees C. for 3 to 96 hours.

An oxygen-containing gas such as air is preferably introduced in or above the reaction mixture in order to remove alcohol a by-produced alcohol and to prevent polymerization of the (meth)acryloyl group. A nitrogen gas containing no oxygen may be used instead. In a conventional transesterification of a (meth)acrylic ester, an oxygen-containing gas is introduced in or above the reaction mixture to prevent polymerization of the (meth)acryloyl groups. In contrast, in the method of the present invention, the polymerization of the (meth)acryloyl group is prevented by introducing a nitrogen gas without oxygen.

The introduction ratio of the (meth)acryloyl group by the present transesterification is determined using 1H-NMR.

The protons of the methylene group (δ=0.42) bonded to the Si atom of the organopolysiloxane (a1) containing a hydroxy group as a raw material do not change before and after the transesterification. Therefore, the proton peak was taken as a base for caluculation of a ratio of the (meta) acryloyl group introduced in the transesterification.

The protons of the methacryloyl group in the radical-polymerizable organopolysiloxane of the present invention appear at positions δ=6.03, 5.47, and the protons of the acryloyl groups appear at positions δ=6.35, 6.08, and 5.74.

Assuming that the integrated peak of the protons of the methylene is 1.00 and an introduction ratio of the (meth) acryloyl group is 100%, the integrated peak of the protons of the (meth)acryloyl group is 0.50.

The introduction ratio of the (meth)acryloyl group is calculated according to the following equation (5) or (6):

Introduction ratio of methacryloyl group=[(average of the integrated peaks of the two protons of the methacryloyl group)/0.50]×100(%)  (5)

Introduction ratio of acryloyl group introduction ratio=[(average of the integrated peaks of the three protons of the acryloyl group)/0.50]×100 (%)  (6)

The introduction ratio of the (meth)acryloyl group by the transesterification reaction is 70% to 100%, preferably 75% to 100%, and more preferably 80% to 100%.

The (meth)acryloyl group introduction ratio in the formulas (5) and (6) is 70% to 100%, preferably 75% to 100%, and more preferably 80% to 100%. If the ratio in the formula (5) or (6) is less than 70%, the proportion of the (meth) acryloyl group in the (meth)acryloyl group-containing radical-polymerizable organopolysiloxane (A) is too small and the curability decreases.

The (meth)acryloyl group-containing organopolysiloxane obtained by the method of the present invention as described above is particularly represented by the following average composition formula (7).

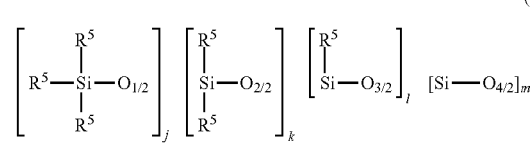

(7)

wherein $R^5$ is a group as defined for $R^1$ in the aforementioned average compositional formula (1), or a monovalent hydrocarbon group having a (meth)acryloyloxy group at a terminal thereof, or a (poly)oxyalkylenealkyl group, hereinafter comprehensively referred to as a (meth) acryloyloxy group-containing group. At least one of $R^5$ is a (meth)acryloyloxy group-containing group. The number of silicon atoms to which the (meth)acryloyloxy group-containing group is bonded is preferably from 1 to 50%, more preferably 2 to 45%, and even more preferably 3 to 40%, based on the total number of silicon atoms. If the amount of the (meth)acryloyloxy group-containing group is less than the aforesaid lower limit, the curability may be too low. If the amount is larger than the aforesaid upper limit, the peeling property of the obtained release sheet to an adhesive tape may be poor.

The (meth)acryloyloxy group-containing group is a group in which the terminal hydroxy group of the hydroxy group-containing group is substituted with a (meth)acryloyloxy group. Therefore, unlike the group in which a (meth)acryloyloxy group is introduced by ring opening of an epoxy group, the (meth)acryloyloxy group-containing group does not have a hydroxy group. Preferred is a monovalent hydrocarbon group having 2 to 10, preferably 3 to 6, carbon atoms and having one (meta)acryloyloxy group at the terminal, or a (poly)oxyalkylene alkyl group having 4 to 25, preferably 5 to 16, carbon atoms and having one (meta)acryloyloxy group at the terminal. Examples of the oxyalkylene group are as described above, oxyethylene groups and oxyisopropylene groups are preferred, and may have two or more oxyalkylene groups. For example, they may be represented by the following formulas, wherein the mark "*" represents a position to which a silicon atom of the polysiloxane bonds.

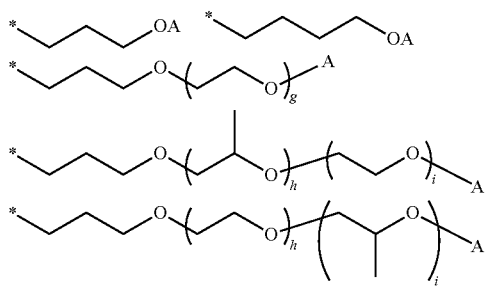

wherein A is a (meth)acryloyl group, g is an integer of 1 to 10, h and i are, independently of each other, an integer of 1 to 5. Preferably, g is an integer of 1 to 7, and h and i are, independently of each other, an integer of 1 to 3. More preferably, g is an integer from 1 to 4 and h and i are, independently of each other, 1 or 2. In the formulas, the order of bonding of ethylene oxide and propylene oxide in the parentheses is not limited, and may be at random or such as to form a block structure.

In the average composition formula (7), j is a positive number of 2 or more, k is an integer number of 0 or more, l is an integer number of 0 or more, m is an integer number of 0 or more, and $2 \leq j+k+l+m \leq 1,000$. These are preferrably such that the amount of the (meta)acryloyloxy group-containing organic groups satisfies the aforesaid range and the organopolysiloxane has a viscosity of 5 to 10,000 mPa·s, more preferably 10 to 5,000 mPa·s, at 25 degrees C. The (meth)acryloyl group-containing organopolysiloxane obtained in the present method has a low viscosity at 25 degrees C., such as 5 to 3000 mPa·s, more preferably 5 to 2000 mPa·s, even more preferably 8 to 1500 mPa·s, even 10 to 1000 mPa·s, especially 15 to 700 mPa·s. The viscosity is determined by a BM rotary viscometer.

The present invention further provides a radiation curable organopolysiloxane composition comprising (A) the (meth)acryloyl group-containing organopolysiloxane represented by the average composition formula (7) and a radical polymerization initiator (B).

(B) Radical Polymerization Initiator

The radical polymerization initiator is not particularly limited as long as it has the ability to generate radicals under irradiation. Examples of the radical polymerization initiator include diethoxyacetophenone, 2-hydroxy-2-methyl-1-phenylpropane-1-one, 4'-propyl-2-hydroxy-2-methylpropiophenone, 2-hydroxymethyl-2-methylpropiophenone, 2,2-dimethoxy-1,2-diphenylethane-1-one, p-dimethylaminoacetophenone, p-tertiary butyl dichloroacetophenone, p-tertiary butyl trichloroacetophenone, p-azidobenzalacetophenone, 1-hydroxycyclohexylphenyl ketone, 2-methyl-1-[4-(methylthio)phenyl]-2-morpholinopropanone-1, 2-benzyl-2-dimethylamino-1-(4-morpholinophenyl)-butanone-1, benzoin, benzoin methyl ether, benzoin ethyl ether, benzoin isopropyl ether, benzoin-n-butyl ether, benzoin isobutyl ether, benzyl, anisyl, benzophenone, o-benzoylmethylbenzoate, Michler ketone, 4,4'-bisdiethylaminobenzophenone, 4,4'-dichlorobenzophenone, 4-benzoyl-4'-methyldiphenyl sulfide, thioxanthone, 2-methylthioxanthone, 2-ethylthioxantone, 2-chlorothioxantone, 2-isopropylthioxantone, 2,4-diethylthioxanthone, bis(cyclopentadienyl)-bis(2,6-difluoro-3-(pyr-1-yl)titanium, and 1-(4-(2-hydroxyethoxy)phenyl)-2-hydroxydi-2-methyl-1-propane-1-one. These radical polymerization initiators may be used alone or in combination of two or more of them.

The amount of the radical polymerization initiator (B) is preferably 0.1 to 10 parts by mass, preferably 0.5 to 8 parts by mass, more preferably 1 to 5 parts by mass, relative to 100 parts by mass of the (meth)acryloyl group-containing organopolysiloxane (A). If the amount of component (B) is less than the aforementioned lower limit, the curability of the composition is lower. Even if the amount of component (B) is larger than the afore-mentioned upper limit, the curability is not particularly improved, and, rather, the peeling property of the cured product obtained is worse.

The radiation curable organopolysiloxane composition of the present invention is obtained by mixing components (A) and (B). In addition to these components, other additives may be incorporated, if necessary, such as a silicone resin, a polydimethylsiloxane, a filler, an antistatic agent, a flame retardant, an antifoaming agent, a flow regulator, a photostabilizer, a solvent, a non-reactive resin, and another radical polymerizable compound. The amount of the additives may be appropriately adjusted according to the conventional technique as long as the effects of the invention are not diminished. The organopolysiloxane composition of the present invention may be diluted in use by an organic solvent.

The radiation curable organopolysiloxane composition of the present invention is applied to various substrates and cured by irradiation to provide a release sheet. The substrate is not particularly limited and may be one conventionally used for a release sheet. Examples of the substrate include glassine paper, clay-coated paper, high-quality paper, polyethylene laminated paper, plastic films such as a polyester film, a polystyrene film, a polyethylene film and a polypropylene film; films of transparent resins such as a polycarbonate, and metal foils such as an aluminum foil. The amount of the coated organopolysiloxane composition is not particularly limited and may be set as in the conventional release sheet. Generally, it may be about 0.05 to 3.0 g/m².

The curing may occur by irradiation. Radiation energy rays are preferably ultraviolet through visible lights in the range of about 100 to 800 nm, which are obtained by high pressure or ultrahigh pressure mercury lamps, metal halide lamps, xenon lamps, carbon arc lamps, fluorescent lamps, semiconductor solid-state lasers, argon lasers, He—Cd lasers, KrF excimer lasers, ArF excimer lasers or F2 lasers. A radiation source having a high light intensity in the range of 200 to 400 nm is preferable. Furthermore, a radiation source having a high energy such as an electron beam or X-ray may be used. The irradiation period of time is usually about 0.1 to 10 seconds at room temperature. However, a larger period of time may be preferred, when transmittance for the energy rays is low or when the film thickness of the curable composition is large. If necessary, after the irradiation, the composition may be heated above room temperature and at or below 150 degrees C. for several seconds to several hours for after-curing.

Although the radiation curable organopolysiloxane composition may be cured by irradiation even in air, it is preferable to cure the composition in a lower oxygen concentration in order to improve the curability. When the oxygen concentration is lower, the curability is higher. Therefore, the oxygen concentration is preferably as low as possible. The oxygen concentration is preferably 1% by volume, more preferably 0.1% by volume, more preferably 0.01% by volume.

The release sheet composed of the substrate and the cured product obtained by curing the present radiation-curable organopolysiloxane composition has a good release property from an adhesive tape. The adhesive tape is peeled off with a small force (called "light peeling") and the residual adhesion of the adhesive tape after peeled is high. Therefore, the cured product of the radiation-curable organopolysiloxane composition of the present invention is suitably used as a release layer.

EXAMPLES

The present invention will be explained below in further detail with reference to a series of the Examples and the Comparative Examples. However, the present invention is in no way limited by these Examples. In the following, the properties described in the Table were determined according to test methods described below. The viscosity was determined at 25 degrees C. by a BM-type rotary viscometer.

A ratio of the (meth)acryloyl group introduced in the transesterification in the Examples or Comparative Examples was calculated as follows.

In $^1$H-NMR analysys, the protons of the methylene group ($\delta$=0.42) bonded to the Si atom of (a1) organopolysiloxane containing a hydroxy group as a raw material do not change before and after the transesterification. Therefore, the proton peak was taken as a base for caluculation of a ratio of the (meta)acryloyl group introduced in the transesterification.

Assuming that the integrated peak of the protons of the methylene is 1.00 and a ratio of the (meth)acryloyl group introduced in the transesterification is 100%, the integrated peak of the protons of the (meth)acryloyl group is 0.50.

The introduction ratio of the acryloyl group was calculated according to the following equation (6):

Acryloyl group introduction ratio=[(average of the integrated peak of the three protons of the acryloyl group)/0.50]×100(%)  (6)

Example 1

To a 300-mL three-neck flask equipped with a stirring device, a thermometer and a Dean-Stark device, were added 69.82 g of (a1) organopolysiloxane represented by the following average composition formula (a1-1) and having a viscosity at 25 degrees C. of 35 mPa·s, 45.10 g of (a2) ethyl acrylate (a2-1) (i.e., a molar ratio to mole of the functional group of the organopolysiloxane of 3.0), 3.661 g of (a3) zirconium acetylacetonate (i.e., a molar ratio to mole of the hydroxy group of the organopolysiloxane of 0.05), 0.51 g of (a4) diethylhydroxyamine (a4-1) (i.e., a molar ratio to mole of the zirconium catalyst of 0.76), 0.059 g of (a5) 2,6-di-tert-butyl-4-methylphenol (a5-1)(0.05 part by weight, relative to the total 100 parts by weight of components (a1) and (a2)), and 93.54 g of (a6) toluene (81.4% by weight, based on the total weight of components (a1) through (a6)). The mixture was heated and stirred at 85 degrees C. for 24 hours while removing by-produced ethanol. The reaction mixture was filtrated and subjected to distillation at a reduced pressure of 20 mmHg and 85 degrees C. for 2 hours to obtain a radical-polymerizable organopolysiloxane (A-1) which has a viscosity of 17 mPa·s at 25 degrees C. and is represented by the following average composition formula (8). The introduction ratio of the acryloyl group in the transesterification was >99%.

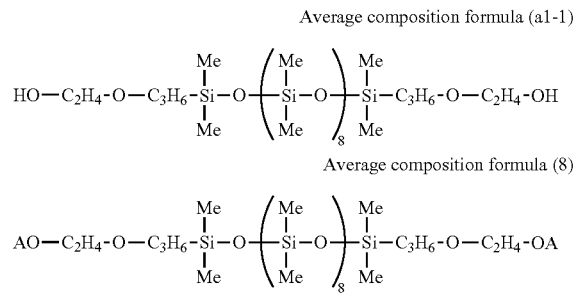

In the formulas, Me is a methyl group and AO is an acryloyloxy group.

Example 2

The procedures of Example 1 were repeated, except that zirconium tetrakis(ethylacetoacetate) (a3-2) was used instead of the zirconium metal complex and the amounts of components (a1) through (a6) were changed as described below. Then, a radical-polymerizable organopolysiloxane (A-2) represented by the aforesaid average composition formula (8) and having a viscosity of 18 mPa·s at 25 degrees C. was obtained. The introduction ratio of the acryloyl group in the transesterification was >99%.

The amounts of components (a1) through (a6) were as follows.

(a1) 68.97 g of organopolysiloxane represented by the average composition formula (a1-1), (a2) 44.55 g of ethyl acrylate (a2-1) (i.e., a molar ratio to mole of the functional group of organopolysiloxane of 3.0), (a3) 4.51 g of zirconium tetrakis(ethyl acetoacetate) (a3-2) (i.e., a molar ratio to mole of the hydroxy group of organopolysiloxane of 0.05), (a4) 0.51 g of diethylhydroxyamine (a4-1) (i.e., a molar ratio to mole of the zirconium catalyst of 0.76), (a5) 0.059 g of 2,6-di-butyl tert-4-methylphenol (a5-1), and (a6) 92.40 g of toluene.

Example 3

The procedures of Example 1 were repeated, except that the amounts of components (a1) through (a6) were changed as described below. Then, a radical-polymerizable organopolysiloxane (A-3) represented by the aforesaid average composition formula (8) and having a viscosity of 18 mPa·s at 25 degrees C. was obtained. In the radical-polymerizable organopolysiloxane (A-3), a part of OA in the average composition formula (8) was a hydroxy group, and the introduction ratio of the acryloyl group in the transesterification was 95%.

The amounts of components (a1) through (a6) were as follows.

(a1) 79.70 g of organopolysiloxane represented by the average composition formula (a1-1), (a2) 34.32 g of ethyl acrylate (a2-1) (i.e., a molar ratio to mole of the functional group of organopolysiloxane of 2.0), (a3) 4.179 g of zirconium acetylacetonate (a3-1) (i.e., a molar ratio to mole of the hydroxy group of organopolysiloxane of 0.05), (a4) 0.58 g of diethylhydroxyamine (a4-1) (i.e., a molar ratio to mole of the zirconium catalyst of 0.76),
(a5) 0.05 9 g of 2,6-di-tert-butyl-4-methylphenol (a5-1), and
(a6) 92.81 g of toluene.

Example 4

The procedures of Example 1 were repeated, except that the amounts of components (a1) through (a6) were changed as described below. Then, a radical-polymerizable organopolysiloxane (A-4) represented by the aforesaid average composition formula (8) and having a viscosity of 18 mPa·s at 25 degrees C. was obtained. In the radical-polymerizable organopolysiloxane (A-4), a part of OA in the average composition formula (8) was a hydroxy group, and the introduction ratio of the acryloyl group in the transesterification was 95%.

The amounts of components (a1) through (a6) were as follows.

(a1) 82.65 g of organopolysiloxane represented by the average composition formula (a1-1),
(a2) 35.59 g of ethyl acrylate (a2-1) (i.e., a molar ratio to mole of the functional group of organopolysiloxane of 2.0),
(a3) 1.734 g of zirconium acetylacetonate (a3-1) (i.e., a molar ratio to mole of the hydroxy group of organopolysiloxane of 0.02),
(a4) 0.242 g of diethylhydroxyamine (a4-1) (i.e., a molar ratio to mole of the zirconium catalyst of 0.76),
(a5) 0.060 g of 2,6-di-tert-butyl-4-methylphenol (a5-1), and
(a6) 96.25 g of toluene.

Example 5

The procedures of Example 1 were repeated, except that the amounts of components (a1) through (a6) were changed as described below. Then, a radical polymerizable organopolysiloxane (A-5) represented by the aforesaid average composition formula (8) and having a viscosity of 18 mPa·s at 25 degrees C. was obtained. In the radical-polymerizable organopolysiloxane (A-5), a part of OA in the average composition formula (8) was a hydroxy group, and the introduction ratio of the acryloyl group in the transesterification was 90%.

The amounts of components (a1) through (a6) were as follows.

(a1) 71.36 g of organopolysiloxane represented by the average composition formula (a1-1),
(a2) 46.09 g of ethyl acrylate (a2-1) (i.e., a molar ratio to mole of the functional group of organopolysiloxane of 3.0),
(a3) 2.25 g of zirconium acetylacetonate (a3-1) (i.e., a molar ratio to mole of the hydroxy group of organopolysiloxane of 0.02),
(a4) 0.16 g of diethylhydroxyamine (a4-1) (i.e., a molar ratio to mole of the zirconium catalyst of 0.38),
(a5) 0.060 g of 2,6-di-tert-butyl-4-methylphenol (a5-1), and
(a6) 95.60 g of toluene.

Example 6

The procedures of Example 1 were repeated, except that the amounts of components (a1) through (a6) were changed as described below. Then, a radical-polymerizable organopolysiloxane (A-6) represented by the aforesaid average composition formula (8) and having a viscosity of 18 mPa·s at 25 degrees C. was obtained. In the radical-polymerizable organopolysiloxane (A-6), a part of OA in the average composition formula (8) was a hydroxy group, and the introduction ratio of the acryloyl group in the transesterification was 90%.

The amounts of components (a1) through (a6) were as follows.

(a1) 71.27 g of organopolysiloxane represented by the average composition formula (a1-1),
(a2) 46.09 g of ethyl acrylate (a2-1) (i.e., a molar ratio to mole of the functional group of organopolysiloxane of 2.0),
(a3) 2.24 g of zirconium acetylacetonate (a3-1) (i.e., a molar ratio to mole of the hydroxy group of organopolysiloxane of 0.02),
(a4) 0.41 g of diethylhydroxyamine (a4-1) (i.e., a molar ratio to mole of the zirconium catalyst of 1.00),
(a5) 0.060 g of 2,6-di-tert-butyl-4-methylphenol (a5-1), and
(a6) 95.49 g of toluene.

Example 7

The procedures of Example 1 were repeated, except that organopolysiloxane represented by the following average composition formula (a1-2) with a viscosity of 500 mPa·s at 25 degrees C. was used instead of the organopolysiloxane (a1) and the amounts of components (a1-2) through (a6) were changed as described below. Then, a radical-polymerizable organopolysiloxane (A-7) represented by the following average composition formula (9) and having a viscosity of 200 mPa·s at 25 degrees C. was obtained. The introduction ratio of the acryloyl group in the transesterification was >99%.

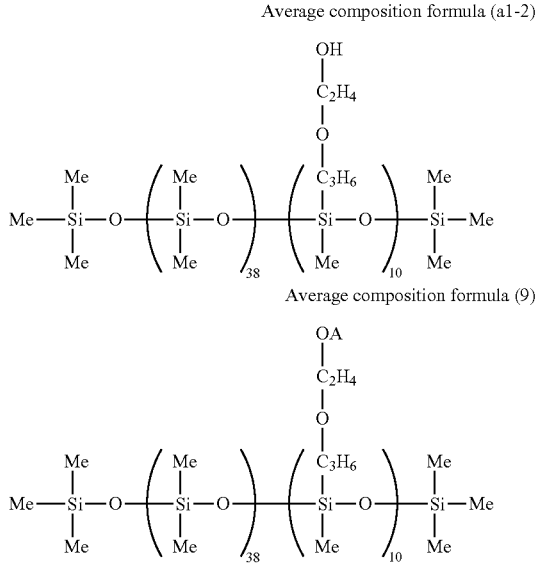

In the formulas, Me is a methyl group and AO is an acryloyloxy group.

The amounts of components (a1) through (a6) were as follows.

(a1) 88.61 g of organopolysiloxane represented by the average composition formula (a1-2),
(a2) 57.93 g of ethyl acrylate (a2-1) (i.e., a molar ratio to mole of the functional group of organopolysiloxane of 3.0), (a3) 4.70 g of zirconium acetylacetonate (a3-1) (i.e., a molar ratio to mole of the hydroxy group of organopolysiloxane of 0.05), (a4) 0.66 g of diethylhydroxyamine (a4-1) (i.e., a molar ratio to mole of the zirconium catalyst of 0.76), (a5) 0.077 g of 2,6-di-tert-butyl-4-methylphenol (a5-1) (0.05 part by weight, relative to total 100 parts by weight of compositions (a1) and (a2)), and (a6) 58.62 g of toluene (40 weight %, based on total 100 parts by weight of compositions (a1) through (a6)).

Example 8

The procedures of Example 7 were repeated, except that the amount of toluene was 10 weight %, based on a total weight of components (a1) through (a6), and the amounts of components (a1) through (a5) were changed as described below. Then, a radical-polymerizable organopolysiloxane (A-8) represented by the average composition formula (9) and having a viscosity of 210 mPa·s at 25 degrees C. was obtained. In the radical-polymerizable organopolysiloxane (A-8), a part of OA in the average composition formula (9) was a hydroxy group, and the introduction ratio of the acryloyl group in the transesterification was 90%.
The amounts of components (a1) through (a6) were as follows. The ratios of components (a2) through (a4) were same as in Example 7.

(a1) 110.74 g of organopolysiloxane represented by the average composition formula (a1-2), (a2) 72.40 g of ethyl acrylate (a2-1), (a3) 5.88 g of zirconium acetylacetonate (a3-1), (a4) 0.82 g of diethylhydroxyamine (a4-1), (a5) 0.097 g of 2,6-di-tert-butyl-4-methylphenol (a5-1) (0.05 part by weight, relative to total 100 parts by weight of components (a1) and (a2)), and (a6) 18.31 g of toluene (10 weight %, based on the total weight of components (a1) through (a6)).

Example 9

The procedures of Example 7 were repeated, except that 2-tert-butyl-4-methyl-6-(2-hydroxy-3-tert-butyl-5-methylbenzyl)phenyl acrylate was used as the radical polymerization inhibitor (a5), the amounts of components (a1) through (a5) were changed as described below, and toluene (a6) was not used. Then, a radical-polymerizable organopolysiloxane (A-9) represented by the average composition formula (9) and having a viscosity of 215 mPa·s at 25 degrees C. was obtained. In the radical-polymerizable organopolysiloxane (A-9), a part of OA in the average composition formula (9) was a hydroxy group, and the introduction ratio of the acryloyl group in the transesterification was 87%.
The amounts of components (a1) through (a6) were as follows. The ratios of components (a2) through (a4) were same as in Example 7.

(a1) 120.69 g of organopolysiloxane represented by the average composition formula (a1-2), (a2) 78.91 g of ethyl acrylate (a2-1), (a3) 6.41 g of zirconium acetylacetonate (a3-1), (a4) 0.89 g of diethylhydroxyamine (a4-1), (a5) 0.318 g of 2-tert-butyl-4-methyl-6-(2-hydroxy-3-tert-butyl-5-methylbenzyl)phenyl acrylate (a5-2) (0.15 part by weight, relative to total 100 parts by weight of components (a1) and (a2)), and (a6) 0 g of toluene.

Example 10

The procedures of Example 7 were repeated, except that 2-tert-butyl-4-methyl-6-(2-hydroxy-3-tert-butyl-5-methylbenzyl)phenyl acrylate was used as the radical polymerization inhibitor (a5), the amounts of components (a1) through (a5) were changed as described below, and toluene (a6) was not used. Then, a radical-polymerizable organopolysiloxane (A-10) represented by the average composition formula (9) and having a viscosity of 213 mPa·s at 25 degrees C. was obtained. In the radical-polymerizable organopolysiloxane (A-10), a part of OA in the average composition formula (9) was a hydroxy group, and the introduction ratio of the acryloyl groups in the transesterification was 89%.
The amounts of components (a1) through (a6) were as follows. The ratios of components (a2) through (a4) were same as in Example 7.

(a1) 128.94 g of organopolysiloxane represented by the average composition formula (a1-2), (a2) 84.30 g of ethyl acrylate (a2-1), (a3) 2.05 g of zirconium acetylacetonate (a3-1) (i.e., a molar ratio to mole of the hydroxy group of organopolysiloxane of 0.015), (a4) 0.29 g of diethylhydroxyamine (a4-1), (a5) 0.326 g of 2-tert-butyl-4-methyl-6-(2-hydroxy-3-tert-butyl-5-methylbenzyl)phenyl acrylate (a5-2) (0.15 part by weight, relative to total 100 parts by weight of (a1) and (a2), and (a6) 0 g of toluene.

Example 11

The procedures of Example 7 were repeated, except that 2-tert-butyl-4-methyl-6-(2-hydroxy-3-tert-butyl-5-methylbenzyl)phenyl acrylate was used as the radical polymerization inhibitor (a5), the amount of components (a1) through (a5) were changed as described below, and toluene (a6) was not used. Then, a radical-polymerizable organopolysiloxane (A-11) represented by the average composition formula (9) and having a viscosity of 210 mPa·s at 25 degrees C. was obtained. In the radical-polymerizable organopolysiloxane (A-11), a part of OA in the average composition formula (9) was a hydroxy group, and the introduction ratio of the acryloyl group in the transesterification was 89%.
The amounts of components (a1) through (a6) were as follows. The ratios of components (a2) through (a4) were same as in Example 7.

(a1) 132.34 g of organopolysiloxane represented by the average composition formula (a1-2), (a2) 86.53 g of ethyl acrylate (a2-1), (a3) 702 g of zirconium acetylacetonate (a3-1) (i.e., a molar ratio to mole of the hydroxy group of organopolysiloxane of 0.005), (a4) 0.10 g of diethylhydroxyamine (a4-1), (a5) 0.328 g of 2-tert-butyl-4-methyl-6-(2-hydroxy-3-tert-butyl-5-methylbenzyl)phenyl acrylate (a5-2) (0.15 part by weight, relative to total 100 parts by weight of components (a1) and (a2)), and (a6) 0 g of toluene.

Comparative Example 1

The procedures of Example 1 were repeated, except that diethylhydroxyamine (a4) was not used. Then, a radical-polymerizable organopolysiloxane (A-12) represented by the average composition formula (8) and having a viscosity of 25 mPa·s at 25 degrees C., in which a part of OA was a hydroxy group, was obtained. The introduction ratio of the acryloyl group in the transesterification was 65%.

Comparative Example 2

The procedures of Example 1 were repeated, except that potassium hydroxide was used instead of the zirconium catalyst (a3) and the amine (a4), and the amounts of the components were changed as described below. Then, a radical-polymerizable organopolysiloxane (A-13) represented by the average composition formula (8) and having a viscosity of 38 mPa·s at 25 degrees C., in which a part of OA was a hydroxy group, was obtained. The introduction ratio of the acryloyl group in the transesterification was 15%.

The amounts of the components were as follows.

(a1) 72.51 g of organopolysiloxane represented by the average composition formula (a1-1), (a2) 46.84 g of ethyl acrylate (a2-1), (catalyst for transesterification) 0.31 g of potassium hydroxide (i.e., a molar ratio to mole of the hydroxy group of organopolysiloxane of 0.05), (a5) 0.061 g of 2,6-di-tert-butyl-4-methylphenol (a5-1) and (a6) 97.15 g of toluene.

Comparative Example 3

The procedures of Example 1 were repeated, except that para-toluene sulfonic acid monohydrate was used instead of the zirconium catalyst (a3) and the amine (a4), and the amounts of the components were changed as described below. Then, a radical-polymerizable organopolysiloxane (A-14) represented by the average composition formula (8) and having a viscosity of 26 mPa·s at 25 degrees C., in which a part of OA was a hydroxy group, was obtained. The introduction ratio of the acryloyl group in the transesterification was 55%.

The amounts of the components were as follows.

(a1) 70.76 g of organopolysiloxane represented by the average composition formula (a1-1), (a2) 45.70 g of ethyl acrylate (a2-1), (catalyst for transesterification) 1.45 g of para-toluene sulfonic acid monohydrate (i.e., a molar ratio to mole of the hydroxy group of organopolysiloxane of 0.05), (a5) 0.060 g of 2,6-di-tert-butyl-4-methylphenol (a5-1), and (a6) 94.80 g of toluene.

Comparative Example 4

The procedures of Example 7 were repeated, except that diethylhydroxyamine (a4) was not used. Then, a radical-polymerizable organopolysiloxane (A-15) represented by the average composition formula (9) and having a viscosity of 300 mPa·s at 25 degrees C., in which a part of OA was a hydroxy group, was obtained. The introduction ratio of the acryloyl group in the transesterification was 58%.

In the following Comparative Examples 5 and 6, acryl-modified organopolysiloxanes were prepared according to the method described in Japanese Examined Patent Publication No. Hei 5-83570.

Comparative Example 5

To a 300-mL separable flask equipped with a stirrer, a thermometer, a dropping funnel, and a refluxing condenser, were placed 80.86 g of an epoxy-modified organopolysiloxane represented by the following average composition formula (15), 0.95 g of 1,4-diazabicyclo[2.2.2]octane, 0.059 g of 2,6-di-tert-butyl-4-methylphenol, and 95.40 g of toluene and heated to 50 degrees C. When the temperature reached 50 degrees C., a mixture of 36.55 g of acrylic acid and 6.40 g of acrylic anhydride was dropped from the dropping funnel. After the end of the dropping, a temperature of the mixture was raised to 90 to 100 degrees C. and maintained with stirring for 40 hours. Thereafter, the mixture was subjected to vacuum distillation at 20 mmHg and 120 degrees C. for 3 hours and, then, subjected to filtration to thereby obtain a radical-polymerizable organopolysiloxane (A-16) represented by the following average composition formula (16) and having a viscosity of 600 mPa·s at 25 degrees C.

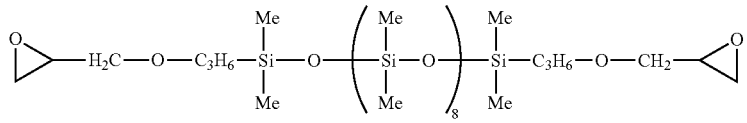

Average composition formula (15)

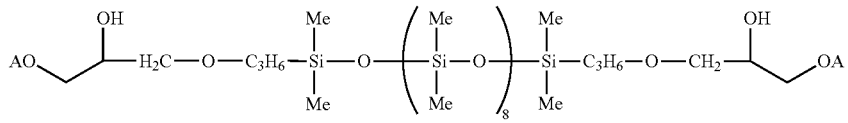

Average composition formula (16)

In the formulas, Me is a methyl group and AO is an acryloyloxy group.

Comparative Example 6

To a 300-mL separable flask equipped with a stirrer, a thermometer, a dropping funnel, and a refluxing condenser, were placed 80.29 g of an epoxy-modified organopolysiloxane represented by the average composition formula (17), 0.96 g of 1,4-diazabicyclo[2.2.2]octane, 0.176 g of 2-tert-butyl-4-methyl-6-(2-hydroxy-3-tert-butyl-5-methylbenzyl)phenyl acrylate, and 95.32 g of toluene, and heated to 50 degrees C. When the temperature reached 50 degrees C., a mixture of 36.82 g of acrylic acid and 6.44 g of acrylic anhydride was dropped from the dropping funnel. After the end of the dropping, a temperature of the mixture was raised to 90 to 100 degrees C. and maintained with stirring for 40 hours. Thereafter, the mixture was subjected to vacuum distillation at 20 mmHg and 120 degrees C. for 3 hours, but the mixture did not gel and a desired product was not obtained.

Average composition formula (17)

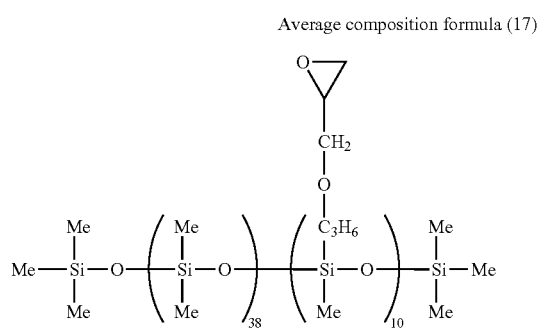

The amount of the components, the acryloyl introduction ratios and the viscosities of the obtained radical-polymerizable polyorganosiloxanes in Examples 1 to 11 and Comparative Examples 1 to 6 are summarized in Table 1. In Table 1, column (V) indicates the molar ratio of the (meth)acrylic compound (a2) to mole of the functional group of the organopolysiloxane (a1). Column (W) indicates the molar ratio of the zirconium metal complex (a3) to mole of the hydroxy group of organopolysiloxane (a1). Column (X) indicates the molar ratio of the amine (a4) to mole of the zirconium metal complex (a3). Column (Y) indicates the part by weight of the radical polymerization inhibitor (a5), relative to total 100 parts by weight of components (a1) and (a2). Column (Z) indicates the part by weight of the organic solvent (a6), relative to total 100 parts by weight of components (a1) through (a5).

TABLE 1

| | (a1) Organopoly-siloxane | Radical-polymerizable organopoly siloxane | (V) Molar ratio of (meth)acrylic compound | Catalyst | (W) Molar ratio of catalyst | (X) Molar ratio of amine | (Y) Amount of radical polymerization inhibitor | (Z) Amount of solvent | Acryloyl group introduction ratio, % | Viscosity, mPa·s |
|---|---|---|---|---|---|---|---|---|---|---|
| Ex. 1 | (a1-1) | (A-1) | 3 | (a3-1) | 0.05 | 0.76 | 0.05 | 78.5 | >99 | 17 |
| Ex. 2 | (a1-1) | (A-2) | 3 | (a3-2) | 0.05 | 0.76 | 0.05 | 77.9 | >99 | 17 |
| Ex. 3 | (a1-1) | (A-3) | 2 | (a3-1) | 0.05 | 0.76 | 0.05 | 78.1 | 95 | 18 |
| Ex. 4 | (a1-1) | (A-4) | 2 | (a3-1) | 0.02 | 0.76 | 0.05 | 77.0 | 91 | 18 |
| Ex. 5 | (a1-1) | (A-5) | 3 | (a3-1) | 0.02 | 0.38 | 0.05 | 79.7 | 90 | 18 |
| Ex. 6 | (a1-1) | (A-6) | 2 | (a3-1) | 0.02 | 1 | 0.05 | 77.9 | 90 | 18 |
| Ex. 7 | (a1-2) | (A-7) | 3 | (a3-1) | 0.05 | 0.76 | 0.05 | 38.6 | >99 | 200 |
| Ex. 8 | (a1-2) | (A-8) | 3 | (a3-1) | 0.05 | 0.76 | 0.05 | 9.6 | 90 | 210 |
| Ex. 9 | (a1-2) | (A-9) | 3 | (a3-1) | 0.05 | 0.76 | 0.15 | 0 | 87 | 215 |
| Ex. 10 | (a1-2) | (A-10) | 3 | (a3-1) | 0.015 | 0.76 | 0.15 | 0 | 89 | 213 |
| Ex. 11 | (a1-2) | (A-11) | 3 | (a3-1) | 0.005 | 0.76 | 0.15 | 0 | 89 | 210 |

TABLE 2

| | (a1) Organopoly-siloxane | Radical-polymerizable organopoly siloxane | (V) Molar ratio of (meth)acrylic compound | Catalyst | (W) Molar ratio of catalyst | (X) Molar ratio of amine | (Y) Amount of radical polymerization inhibitor | (Z) Amount of solvent | Acryloyl group introduction ratio, % | Viscosity, mPa·s |
|---|---|---|---|---|---|---|---|---|---|---|
| Com. Ex. 1 | (a1-1) | (A-12) | 3 | (a3-1) | 0.05 | 0 | 0.05 | 78.8 | 65 | 25 |
| Com. Ex. 2 | (a1-1) | (A-13) | 3 | KOH | 0.05 | 0 | 0.05 | 81.1 | 15 | 38 |
| Com. Ex. 3 | (a1-1) | (A-14) | 3 | Para-toluene sulfonic acid monohydrate | 0.05 | 0 | 0.05 | 80.4 | 55 | 26 |
| Com. Ex. 4 | (a1-2) | (A-15) | 3 | (a3-1) | 0.05 | 0 | 0.05 | 38.7 | 58 | 300 |
| Com. Ex. 5 | (15) | (A-16) | 3 | | | | 0.05 | 76.4 | 100 | 600 |
| Com. Ex. 6 | (16) | — | 3 | | | | 0.15 | 76.4 | | gelled |

As shown in Table 1, the transesterification between the organopolysiloxane having the hydroxy group-containing organic group and the (meth)acrylic acid ester proceeded well, and the introduction ratio of the acryloyl group was extremely high in the method of the present invention.

In contrast, any hydroxy group-containing amine was not used in Comparative Examples 1 and 4, and the introduction ratios of the acryloyl group were lowered, compared to those in the present method. An acidic or basic compound was used as an ester exchange reaction catalyst in Comparative Examples 2 and 3, and the introduction ratios of the acryloyl group were poor, compared to those in the present method. Comparative Examples 5 and 6 are in accordance with the method described in Japanese Examined Patent Publication No. Hei 5-83570, where acrylic acid or acrylic anhydride is used and there is a problem in safety. Further, the viscosities of the obtained organopolysiloxanes were higher than those of the organopolysiloxanes obtained in the Examples. In particular, the organopolysiloxane in Comparative Example 6 gelled, so that a desired product was not obtained.

Preparation of a Radiation-Curable Organopolysiloxane Composition

Example 12

100 Parts by weight of (A) the radical-polymerizable organopolysiloxane (A-1) obtained in Example 1 and 5.0 parts by weight of (B) 2-hydroxy-2-methyl-1-phenyl-propane-1-one (B-1) which is a radical polymerization initiator were mixed uniformly to obtain a radiation-curable organopolysiloxane composition 1.

Examples 13-22 and Comparative Examples 7-11

The procedures of Example 12 were repeated to obtain radiation-curable organopolysiloxane compositions 2-16, except that the radical-polymerizable organopolysiloxanes (A-2) through (A-16) obtained in Examples 2-11 and Comparative Examples 1-5 were used, respectively, instead of the radical-polymerizable organopolysiloxane (A-1) used in Example 12. The radical-polymerizable organopolysiloxane (A) contained in each of the radiation-curable organopolysiloxane compositions 2-16 is as described in Table 2.

Curability of the radiation-curable organopolysiloxane compositions 1-16 and release properties, such as peel force and residual adhesion, of release sheets obtained by curing the radiation-curable organopolysiloxane compositions were evaluated according to the following manners. The results are as shown in Table 2.

Curability of the Radiation-Curable Organopolysiloxane Composition

Each of the radiation-curable organopolysiloxane compositions 1 to 16 was roll-coated on a PET film having a thickness of 38 micrometers so as to give a coated amount of about 1.0 g/m$^2$, to which were irradiated ultraviolet rays with a 100 mJ/cm$^2$ radiation dose, using two high-pressure mercury lamps of 80 W/cm with an oxygen concentration of 150 ppm to thereby form cured film. The surface of the film was rubbed with a finger 10 times to confirm the curability. When the cured film did not show cloud nor failing-off, the film was evaluated as G. When the cured film showed slight cloud or failing-off, the film was evaluated as P. When the composition did not cure, the film was evaluated as B.

[Peeling Force of the Cured Product]

A cured film, i.e. release sheet, was prepared as described above. After the cured film was stored at 25 degrees C. for 20 hours, an acrylic adhesive tape, TESA7475 (trade name), having a width of 25 mm was applied on the surface of the cured film, and pressure-adhered by one reciprocating motion of a 2-kg roller to prepare a sample for a determining a peel force. The sample was aged at 70 degrees C. for 20 to 24 hours with 70 g/cm$^2$ loading. Thereafter, the acrylic adhesive tape was peeled from the cured film at a peeling rate of 0.3 m/min and a peeling angle of 180°, using a tensile testing machine, to determine a peeling force in N/25 mm.

[Residual Adhesion Ratio of the Cured Product]

A cured film, i.e. release sheet, was prepared as described above. Then, a sample was prepared in the same manner as described for the peeling force. The sample was aged at 70 degrees C. for 20 to 24 hours with 70 g/cm$^2$ loading. Thereafter, the acrylic adhesive tape was peeled off at a peeling rate of 0.3 m/min and a peeling angle of 180°, using a tensile testing machine. Then, the acrylic adhesive tape was applied on an SUS plate, pressure-adhered by one reciprocating motion of a 2-kg roller and left at 25 degrees C. for 30 minutes. A force ($P_1$) required to peel the tape from the SUS plate was determined. A neat acrylic adhesive tape, TESA7475, which had not been adhered to the cured film, was adhered to an SUS plate, and a force ($P_0$) required to peel the tape from the SUS plate was determined. The ratio of ($P_1$) to ($P_0$) was called a residual adhesion ratio.

TABLE 3

| | Composition | Radical-polymerizable organopolysiloxane | Curability | Peeling force, N/25 mm | Residual Adhesion Ratio, % |
|---|---|---|---|---|---|
| Ex. 12 | 1 | (A-1) | G | 0.55 | 99 |
| Ex. 13 | 2 | (A-2) | G | 0.56 | 98 |
| Ex. 14 | 3 | (A-3) | G | 0.52 | 98 |
| Ex. 15 | 4 | (A-4) | G | 0.51 | 97 |
| Ex. 16 | 5 | (A-5) | G | 0.50 | 97 |
| Ex. 17 | 6 | (A-6) | G | 0.51 | 95 |
| Ex. 18 | 7 | (A-7) | G | 0.54 | 98 |
| Ex. 19 | 8 | (A-8) | G | 0.50 | 97 |
| Ex. 20 | 9 | (A-9) | G | 0.48 | 95 |
| Ex. 21 | 10 | (A-10) | G | 0.48 | 96 |
| Ex. 22 | 11 | (A-11) | G | 0.50 | 96 |
| Com. Ex. 7 | 12 | (A-12) | P | — | — |
| Com. Ex. 8 | 13 | (A-13) | B | — | — |
| Com. Ex. 9 | 14 | (A-14) | P | — | — |
| Com. Ex. 10 | 15 | (A-15) | P | — | — |
| Com. Ex. 11 | 16 | (A-16) | G | 1.55 | 98 |

The compositions of Comparative Examples 7-10 did not cure sufficiently and were inferior in curability. The release sheet obtained from the composition of Comparative Example 11 required a too much large force (peeling force) to be peeled off from the adhesive tape. In contrast, the compositions comprising the radical-polymerizable organopolysiloxanes of the present invention were excellent in curability and provided a release sheet which required a small force to be peeled from the adhesive tape and, thus, was a light-release sheet.

INDUSTRIAL APPLICABILITY

According to the method of the present invention, an organopolysiloxane having a lower viscosity is provided, compared to the conventional method of preparing a radical-polymerizable organopolysiloxane using a (meth)acrylic acid as a raw material. Additionally, the present method is less costly and excellent in safety, because an expensive raw material or a highly harmful raw material such as a (meth) acrylic acid is not used. A release sheet composed of a cured product of the radiation curable organopolysiloxane composition comprising the radical-polymerizable organopolysiloxane of the present invention is of light release and high adhesiveness to an adhesive layer. Therefore, the present composition is suitably used for a release sheet such as a release paper and a release film.

The invention claimed is:

1. A method for preparing a (meth)acryloyl group-containing organopolysiloxane, comprising a step of transesterification between the following components (a1) and (a2) in the presence of the following components (a3) and (a4) to obtain the (meth)acryloyl group-containing organopolysiloxane, (a1) an organopolysiloxane represented by the following average composition formula (1):

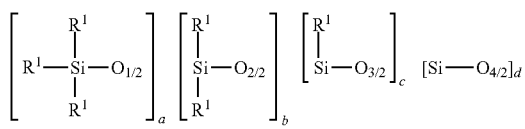

wherein $R^1$ is, independently of each other, a substituted or unsubstituted, monovalent hydrocarbon group having 1 to 10 carbon atoms, an alkoxy group, or a monovalent hydrocarbon or (poly)oxyalkylene alkyl group which has a hydroxy group at a terminal, hereinafter referred to as a hydroxy group-containing group, wherein at least one of $R^1$ is the hydroxy group-containing group, a is a positive number of 2 or more, b is an integral number of 0 or more, c is an integral number of 0 or more, and d is an integral number of 0 or more, and $2 \leq a+b+c+d \leq 1,000$, (a2) a (meth)acrylic acid ester represented by the following general formula (2):

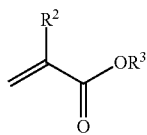

wherein $R^2$ is a hydrogen atom or a methyl group and $R^3$ is a linear or branched hydrocarbon group having 1 to 6 carbon atoms, in an amount such that a molar ratio of component (a2) to the hydroxy group of component (a1) is 1 to 10, (a3) a zirconium metal complex in an amount such that a molar ratio of component (a3) to the hydroxy group of component (a1) is 0.001 to 0.1, and (a4) a hydroxy group-containing amine represented by $HON(R^4)_2$ in an amount such that a molar ratio of component (a4) to component (a3) is 0.10 to 1.5, wherein $R^4$ is, independently of each other, a linear or branched aliphatic hydrocarbon group having 1 to 6 carbon atoms; and wherein (a5) a radical polymerization inhibitor is further present in the step of the transesterification in an amount of 0.001 to 1 part by mass, relative to total 100 parts by mass of components (a1) and (a2).

2. The method according to claim 1, wherein (a6) an organic solvent is further present in the step of the transesterification in an amount of 1 to 200 parts by mass, relative to total 100 parts by mass of components (a1) through (a4) or, if component (a5) being present, relative to total 100 parts by mass of components (a1) through (a5).

3. The method according to claim 1, wherein the zirconium metal complex (a3) is represented by the following general formula (3):

wherein $L^1$ is a ligand selected from a β-dicarbonylate anion and an enolate anion of a β-dicarbonyl-containing compound, $L^2$ is an anionic ligand different from $L^1$, e is an integer of 2 to 4, and f=4-e.

4. The method according to claim 1, wherein the radical polymerization inhibitor (a5) is a hindered phenolic compound.

5. The method according to claim 1, wherein the number of the hydroxy group-bonding silicon atoms in the organopolysiloxane (a1) is 1 to 50%, based on the total number of the silicon atoms in the organopolysiloxane (a1).

6. The method according to claim 1, wherein the (meth) acryloyl group-containing organopolysiloxane is represented by the following average composition formula (7):

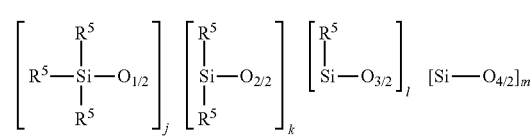

wherein $R^5$ is, independently of each other, a substituted or unsubstituted, monovalent hydrocarbon group having 1 to 10 carbon atoms, an alkoxy group, the aforedefined hydroxy group-containing group, or a monovalent hydrocarbon or (poly)oxyalkylene alkyl group which has a (meth)acryloyloxy group at a terminal, hereinafter referred to as a (meth)acryloyloxy group-containing group, wherein at least one of $R^5$ is the (meth)acryloyloxy group-containing group, j is a positive number of 2 or more, k is an integral number of 0 or more, l is an integral number of 0 or more, m is an integral number of 0 or more, and $2 \leq j+k+l+m \leq 1,000$, and the number of the hydroxy group-bonding silicon atoms is 0 to 30%, based on the total number of silicon atoms.

* * * * *